(No Model.)
J. F. GAMBRELL.
HARNESS ATTACHMENT.
No. 570,548. Patented Nov. 3, 1896.
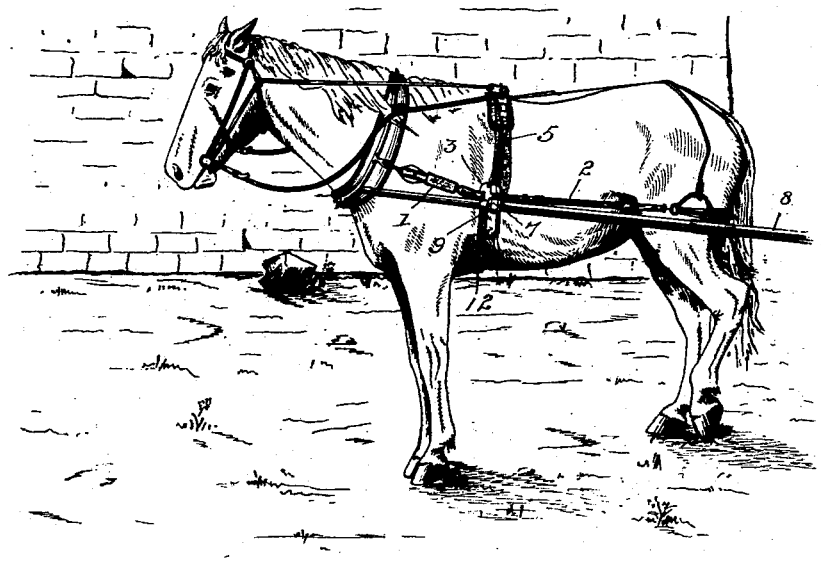
Fig. 1.
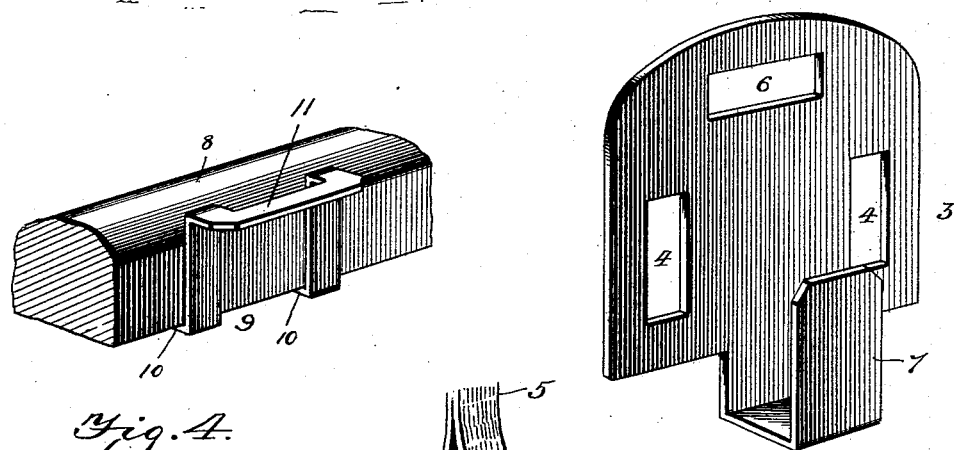
Fig. 4.
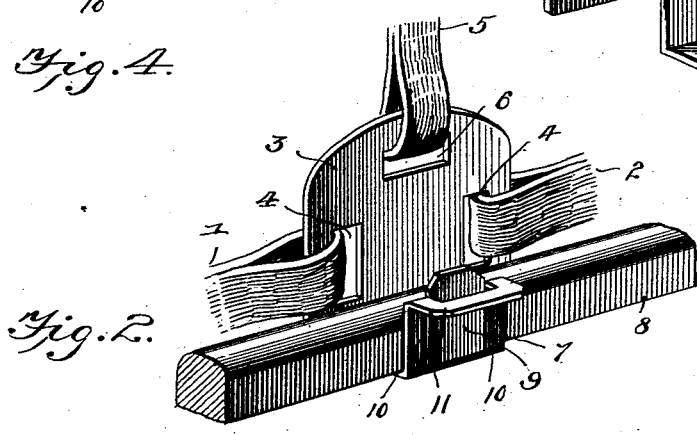
Fig. 3.
Fig. 2.
Witnesses
E. N. Monroe
V. B. Hillyard
Inventor
J. Frank Gambrell,
By his Attorneys,
C. A. Snow & Co.

UNITED STATES PATENT OFFICE.

JAMES FRANK GAMBRELL, OF HONEA PATH, SOUTH CAROLINA.

HARNESS ATTACHMENT.

SPECIFICATION forming part of Letters Patent No. 570,548, dated November 3, 1896.

Application filed April 15, 1896. Serial No. 587,680. (No model.)

*To all whom it may concern:*

Be it known that I, JAMES FRANK GAMBRELL, a citizen of the United States, residing at Honea Path, in the county of Anderson and State of South Corolina, have invented a new and useful Harness Attachment, of which the following is a specification.

This invention relates to harness attachments to facilitate the hitching and unhitching of the horse from a vehicle, and has for its object to devise a simple and effective means to serve as a shaft-tug and a trace-carrier and to obviate the necessity for a singletree, the draft being applied directly to the thills near their front ends.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a detail view showing the invention applied. Fig. 2 is an enlarged detail view showing the attachment in operative position. Fig. 3 is a detail view of the attachment or tug. Fig. 4 is a detail view of an iron to be secured to a thill or shaft.

Corresponding and like parts are referred to in the following description and designated in the several views of the drawings by the same reference-characters.

The harness shown is of ordinary construction, with the exception of the traces, which are divided and form sections 1 and 2. The front section 1 is coupled to the hames in the usual way, and the rear section 2 has connection with the breeching in the ordinary manner, and the adjacent or opposing ends of the sections are buckled or otherwise secured to the tug or attachment 3 by passing through vertical slots 4 near the edges thereof. The saddle or back-band strap 5 passes through a horizontal slot 6 at the upper end of the tug and is fastened thereto in any convenient way, and a hook 7 pendent from the lower edge of the tug receives and supports a thill or shaft 8.

In order to secure a positive connection between the tug and thill and prevent any longitudinal movement of the tug relative to the thill, an approximately U-shaped iron 9 has its terminal portions 10 bent about at right angles and secured in any substantial manner to the bottom side of the thill, with its intermediate portion coming upon the outside of the thill, and having its closed end 11 deflected outwardly, forming a loop through which the terminal portion of the hook 7 passes. The space or depression formed between the parallel members of the U-shaped iron provides a seat to receive the hook 7, as well as shoulders for the edges of the hook to abut against, thereby effectually guarding against any movement of the tug upon the thill.

The girth 12 has its end portions secured to the thills, and is composed of parts which are adapted to be buckled together after the hooks 7 are engaged with the irons 9, thereby preventing accidental disengagement of the hooks from the irons by reason of a vertical movement of the thills, since such movement is essential to the unhitching of the horse. To unhitch the horse the girth is loosened by unbuckling the parts thereof, and the front ends of the thills are elevated to withdraw them from engagement with the hooks 7, and when hitching the horse the reverse of this movement is practiced, and the operation can be effected in a moment's time by simply engaging the hooks 7 with the irons 9 and by buckling the parts of the girth.

The forward pull is upon the front or short sections 1 of the traces, and the backward pull comes upon the rear sections 2, and in each instance the draft is applied directly to the thills through the instrumentality of the tug 3 and the iron 9 coöperating therewith, it being understood that each thill and each side of the harness will be similarly equipped.

Having thus described the invention, what is claimed as new is—

In combination, thills, approximately U-shaped irons secured to the thills and having their closed ends outwardly deflected, a harness having divided traces, a tug secured to the inner or opposing ends of the trace-sections and having a hook to engage with an iron of the thills, and a girth secured to the thills and comprising parts to be buckled together, substantially in the manner set forth for the purpose described.

In testimony that I claim the foregoing as my own I have hereto affixed my signature in the presence of two witnesses.

JAMES FRANK GAMBRELL.

Witnesses:
G. W. MATTISON,
THOMAS J. CLATWORTHY.